United States Patent

Reindl

[15] 3,646,445

[45] Feb. 29, 1972

[54] ADAPTIVE EXTREMAL CODING OF ANALOG SIGNALS

[72] Inventor: Adolf Reindl, Asbury Park, N.J.

[73] Assignee: The United States of America as represented by the Secretary of the Army

[22] Filed: Oct. 2, 1970

[21] Appl. No.: 77,460

Related U.S. Application Data

[63] Continuation-in-part of Ser. No. 628,510, Apr. 4, 1967.

[52] U.S. Cl. ......................325/141, 179/15 AP, 179/15 BV, 179/15 BW, 325/38 R, 325/38 A, 328/14, 328/63, 328/115, 328/151, 332/9

[51] Int. Cl. ..........................................................H04b 1/04

[58] Field of Search ............178/DIG. 3; 179/15 AV, 15 BW, 179/15 AC, 15 BV, 15.55 T, 15 A, 15 AP, 15.55; 325/38 R, 38 A, 38 B, 141; 328/14, 63, 115, 150, 151; 332/9

[56] References Cited

UNITED STATES PATENTS

| | | | |
|---|---|---|---|
| 2,448,718 | 9/1948 | Koulicovitch | 328/150 |
| 3,416,080 | 12/1968 | Wright et al. | 179/15 A |

*Primary Examiner*—Robert L. Griffin
*Assistant Examiner*—Albert J. Mayer
*Attorney*—Harry M. Saragovitz, Edward J. Kelly, Herbert Berl and Jeremiah G. Murray

[57] ABSTRACT

A method of transmitting extreme point samples of an analog waveform is described in which the signal is processed in intervals of a fixed number of bits. During each interval a heading is transmitted indicating in which of the plurality of frames within the interval the extreme points lie. The remainder of the interval comprises the extreme point data plus a variable number of fill-bits. The extreme point data comprises amplitude and fine timing data. The number of encoding levels of the extreme point data decreases as the number of extreme points within the interval increases.

4 Claims, 5 Drawing Figures

| MODE NO. | I | II | III | IV | V | VI | VII |
|---|---|---|---|---|---|---|---|
| NUMBER OF EXTREMES PER INTERVAL | 1–5 | 6 | 7 | 8 | 9–11 | 12–14 | 15–20 |
| NUMBER OF BITS FOR EXTREMAL AMPLITUDES (ENCODING LEVELS) | 6 (64) | 6 (64) | 6 (64) | 5 (32) | 4 (16) | 3 (8) | 2 (4) |
| NUMBER OF BITS FOR FINE TIMING | 2 | 1 | 0 | 0 | 0 | 0 | 0 |
| AVERAGE JITTER TIME IN MICROSECONDS | 10.5 | 21 | 42 | 42 | 42 | 42 | 42 |
| NUMBER OF FILL BITS | 4 – 36 | 2 | 2 | 4 | 0–8 | 2–8 | 4–14 |

INVENTOR,
ADOLF REINDL.
BY Harry M. Saragovitz, Edward J. Kelly, Herbert Berl & Julian C. Keppler
ATTORNEYS INVENTOR,
ADOLF REINDL.
BY Harry M. Saragovitz
Edward J. Kelly, Herbert Berl
& Julian C. Keppler
ATTORNEYS INVENTOR,
ADOLF REINDL.
BY Harry M. Saragovitz, Edward J. Kelly, Herbert Berl & Julian C. Keppler
ATTORNEYS

INVENTOR,
ADOLF REINDL

BY Harry M. Saragovitz, Edward J. Kelly, Herbert Berl & Jeremiah G. Murray
ATTORNEYS.

ADAPTIVE EXTREMAL CODING OF ANALOG SIGNALS

This application is a continuation-in-part of Pat. application Ser. No. 628,510, filed Apr. 4, 1967.

This invention relates to a method of transmitting analog signals in digital form and more specifically to a transmission method which optimizes the amount of intelligence transmitted for a given transmission bit rate and hence maximizes the transmission efficiency. The method involves the detection and transmission of the analog wave extreme points, that is, the maxima and minima of the wave. The receiving equipment reconstructs the analog signal by interpolating between the received extreme points. Analysis has shown that a speech wave with a 3,000 c.p.s. upper frequency limit will contain from 1,500 to 2,500 extreme points per second, depending on the speaker's voice characteristics. The maximum and minimum points of a 3,000 c.p.s. sine wave are separated by 167 microseconds. This period of 167 microseconds determines the bit rate of the digital transmission system required for such a speech wave. For example, if pulse code modulation is utilized and the amplitude of each of the extremal samples is coded into a four bit, 16 level number, it will be necessary for the system to be capable of transmitting four binary bits within 167 microseconds, or 24,000 bits per second. If each extremal sample is thus coded and transmitted as it occurs, the transmission bit rate will vary with the spectrum of the speech signal, being 24,000 bits per second for the highest speech frequency of 3,000 c.p.s. and proportionally lower for the lower frequency components thereof. Thus while the system must be designed to handle the maximum bit rate, it will be transmitting at this rate for only a small percentage of the time. This results in inefficient use of the system apparatus. In accordance with the method of the present invention, the system efficiency is improved by varying the number of encoding levels, or bits per extremal sample, depending on the number of such extremal samples in a fixed interval of the analog signal. This method is termed 'adaptive' because the transmission logic adapts itself to the signal characteristics. Thus the spectral composition of the analog signal within the fixed interval determines the number of levels into which each extremal sample is quantized. Since the higher frequency components result in more extremal samples per unit time, the higher frequencies are coarsely quantized, for example by quantizing and transmitting the highest frequency of 3,000 c.p.s. by means of a two-bit, four-level code. Since more time is available for the transmission of the lower frequency components of the analog signal, these components will be finely quantized, for example, if only one or two extremal samples occur within the fixed interval of the analog wave, these samples could be quantized into one of 64 different levels by means of a six-bit code. Further, these extremal samples are located in time more accurately by means of one or two fine timing bits. Such a method has been found to be capable of transmitting a maximum bandwidth for a given transmission bit rate. Also, the coarse quantizing of the higher frequency components has not been found to impair the intelligibility of the received and reconstructed analog signal to any appreciable degree.

It is thus an object of the invention to provide an improved method of transmitting analog signals by pulse code modulation techniques.

A further object of the invention is to provide a method of transmitting extremal samples of an analog signal in a more efficient manner.

These and other objects and advantages of the invention will become apparent from the following detailed description and drawings in which.

Figures 1, 2:
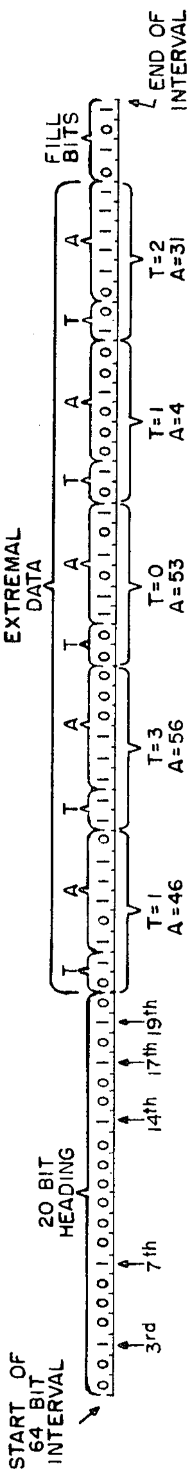
FIG. 1 is a table illustrating how an analog signal is analyzed and processed according to the method of the present invention.
FIG. 2 shows the binary signal representing a single interval of a typical signal processed according to the present method.

The table of FIG. 1 shows how the signal processing adapts itself to the spectral content of the analog signal. According to the illustrative method, the analog signal is analyzed and transmitted in equal intervals, each interval comprising 20 frames of 167 microsecond duration. The intervals are thus 3.33 milliseconds in duration. The frame length of 167 microseconds is determined by the highest frequency component to be transmitted, which in the illustrative case is 3,000 c.p.s. A 3,000 c.p.s. signal contains one extreme point every 167 microsecond microseconds thus a signal of this frequency will contain an The invention described herein may be manufactured, used, and licensed by or for the Government for governmental purposes without the payment to me of any royalty thereon. of the interval. The extreme points of the analog signal are first detected and stored during each frame of the 3.33 millisecond interval and a transmission mode is then selected depending on the number of extreme points within the interval. As shown in the first column of FIG. 1, if the number of extreme points is from one to five, inclusive, the amplitude of each extreme point will be encoded (or quantized) into a six-bit, 64-level binary number for transmission and in addition a two-bit, four-level binary number will accompany each extreme point to provide fine timing, that is, to locate the time position of the extremal point within one of four subframes of its frame. This results in an average time jitter at the receiver of 10.5 microseconds, that is, the time position of the average received extremal point will depart from its 'real time' position by no more than this figure. In the illustrative example each interval comprises 64 bits, of which 20 comprise the heading used to identify the frames within the interval in which extremal points fall. Following the heading is a variable number of characters of extremal data, comprising timing and amplitude portions. Fill bits are used to round out the 64-bit interval. For example, if there is only one extremal point in an interval, only six bits are required to represent its amplitude and two bits for timing. Thus the interval would comprise the 20-bit heading followed by a single extremal data character of eight bits. The remaining 36 time slots in the interval would be taken up by fill bits. If there were five extremal points in the interval, five eight-bit characters or 40 bits would be required to transmit the extremal data, requiring only four fill bits. As seen in FIG. 1, transmission mode II is used if the interval contains six extremal points. In this case, the extremal amplitudes are also encoded to one of 64 levels by means of a six-bit binary number, however only a single bit, two level code is used for fine timing. This results in six seven-bit extremal data characters for a total of 42 bits in addition to the 20-bit heading, requiring two fill bits to complete the 64-bit interval. The smaller number of timing bits increasing the average jitter time to 21 microseconds. In mode III the seven extremal points are transmitted by means of a six-bit, 64-level code with no timing bits. In mode IV, the eight extremal points are transmitted by means of a five-bit, 32-level code. If the number of extremal points if from nine to 11, inclusive, a four-bit, 16-level code is utilized. If the number of extremal points is 12, 13, or 14, mode VI is used and the extremal amplitudes are transmitted by means of three-bit, eight-level binary numbers. In mode VII a two-bit, four-level code is utilized. For modes III through VII no timing bits are transmitted, which means that the position of each received extremal sample is established only within its 167 microsecond frame. This results in an average jitter time of 42 microseconds, which has been found in practice to be tolerable. Use can be made of the fill bits. If, for example, the speech signal is encripted for secrecy purposes, the fill bits may be utilized to keep the cryptomachine at the receiving terminal in synchronism. Also, the fill bits can be used for transmitting data if the system is used in a speech plus data mode.

FIG. 2 shows the transmitted binary pulse train of a single interval of a particular signal which contains extreme points in the third, seventh, 14th, 17th and 19th frames. The heading contains one time slot of each frame of the interval, which in the present case is 20. The 20-bit heading has a binary one in each frame which contains an extremal point and a zero in all other frames. At the receiving terminal, the number of ones in the heading are counted and the appropriate decoding logic circuits automatically actuated in accordance therewith. Further, the positions of the ones in the heading determine the coarse timing, or position of the extremal points within the interval. The five extremal points of FIG. 2 are transmitted with the logic of mode I. Thus, following the 20-bit heading are five eight-bit extremal data characters. The first two bits, T, of each character are the timing bits and the other six bits the extremal amplitude bits. The first character has a fine timing of 1 which means that the extremal point of the third frame falls into the second quarter of that frame. The amplitude of this external point is 46. Similarly the fine timing of the extremal point of the seventh frame is 3 and its amplitude 56, and so on, the final data character representing the extremal point of the 19th frame with a fine timing of 2 and an amplitude of 31. The four fill bits comprise the sequence 0101 to make up the 64-bit interval.

Figure 3:
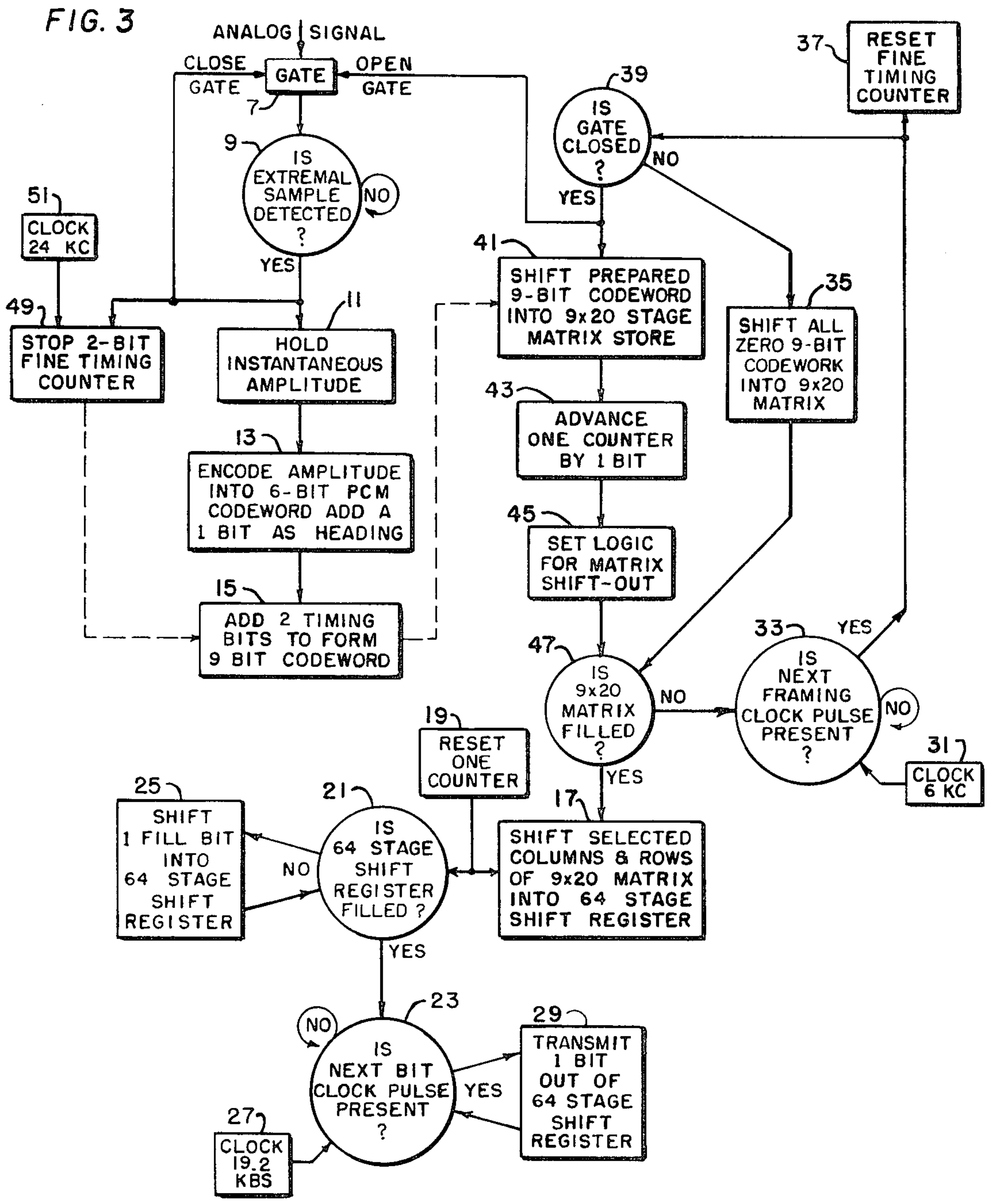
FIGS. 3 and 4 are diagrams illustrating the logic operations involved in transmitting and receiving, respectively, a signal in accordance with the present method.

The diagram of FIG. 3 is a combination flow-block diagram which illustrates the type of logic operations required to practice the present method. Most of FIG. 3 is a flow diagram, with only a few circuit elements indicated in block form, most of these being clocks. The rectilinear blocks indicate 'action' and the circular or elliptical elements represent decisions based on the state of the circuitry, in accordance with the convention of computer flow diagrams.

The analog signal is applied to the input of the open transmission gate 7. Upon the occurrence of an extremal point in the analog signal the decision box 9 will instruct the action box 11 to hold the amplitude of the extremal point, the gate 7 will be closed, and a two-bit fine time timing counter will be stopped by means of action box 49. The fine timing counter is reset at the beginning of each frame by virtue of the clock 31 which operates at the frame rate of 6 kc. as indicated by box 37. The output of 24 kc. clock 51 is counted by the fine timing counter. Since clock 51 operates at four times the frame rate of 6 kc. the fine timing counter reading will be a two-bit binary number proportional to the time position of the extremal sample within the frame. The box 13 denotes a step in which the instantaneous extremal amplitude is encoded into a six-bit PCM number, with an added 1 bit to indicate the presence of the extremal point within the frame. As indicated in box 15, the fine timing bits are added to form a nine-bit codeword. The transmitter or code-generating circuitry includes a storage matrix of the cross-point type with nine columns and 20 rows. This matrix is thus capable of storing 180 bits or 20 nine-bit codewords. Upon the occurrence of the next pulse from the frame-rate clock 31, indicating the beginning of the next frame of the interval, the resulting 'yes' output of the decision box 33 will produce a 'yes' output from decision box 39 which will open gate 7 to await the next extremal point. Decision box 39 also initiates the shifting of the prepared nine-bit codeword of the previous frame to the 9×20 matrix as indicated by action box 41. This shifting operation also advances a ONE counter by one digit, as indicated by box 43. The ONE counter thus totalizes the number of extremal points in each interval and controls the number of encoding levels of each extremal point within the interval in accordance therewith. The different number of encoding levels arise from the way in which the nine-bit codeword is shifted out of the 9×20 matrix. The decision box 45 continually changes this shiftout logic in accordance with the accumulated reading of the ONE counter. If no extremal point has been received and processed during any 167 microsecond frame as defined by clock 31, the gate 7 will be open at the end of the frame, producing a 'no' output from decision box 39 which initiates the application of a nine-bit dummy all-zero codeword into the 9×20 matrix as indicated by box 35. Thus at the end of the 20 frame, 3.33 millisecond interval, the 9×20 matrix will be full. This condition will cause the matrix contents to be shifted out with the proper number of encoding levels to a 64 stage shift register as indicated by boxes 47 and 17. After this shifting operation, the fill bits are added to the shift register to bring the contents thereof up to 64 bits, as indicated by the boxes 21 and 25. When the shift register is full, the contents thereof are shifted out onto the output line in synchronism with the output of the bit-rate clock 27 which in this illustrative example operates at 19.2 kilobits per second. This transmitting operation is indicated by the boxes 23 and 29. The dashed-line connections of FIG. 3 indicate data transfer.

The method just described may be practiced by a computer technician on a standard general purpose digital computer which, of course, is capable of communicating at the input end with the analog signal and at the output end with the particular transmission equipment utilized.

For example, it is common practice for samples of the amplitude of an analog input signal, in the form of an AC voltage, to be converted at the front end of a digital computer into a series of binary words. This process is referred to as pulse-code modulation and may be performed with any analog-digital converter capable of receiving the analog input signal and capable of converting it into the proper digital form acceptable by the computer.

As explained above, in the PCM process, only samples of the analog signal are encoded. The present invention contemplates sampling only the extremal points of the analog signal. Therefore, standard extremal detectors, compatible with the type of analog input signal employed, may be used to detect when an extremal point has occurred. Then, in accordance with the instructions set out in box 9 of FIG. 3, this information is transmitted to the computer to instruct the analog-digital converter to PCM the detected extremal amplitude. Also, the time of occurrence of this extremal amplitude is recorded in the computer by a fine timing counter as indicated by box 49 of FIG. 3.

The output of the computer may be any standard transmitter capable of transmitting binary information in the desired form. For example, it is common practice for general purpose digital computers to include as output equipment telegraph transmitters fully capable of performing the function indicated by box 29 of FIG. 3. All of the remaining storage and logic functions could then be carried out by the standard control, processing, and memory sections of the general purpose digital computer properly programmed in accordance with the logic instructions set out in FIGS. 1 and 3. The actual program instructions would depend, of course, on the computer and the language selected. Therefore, since many alternate sets of program instructions may be readily prepared by skilled artisans with the aid of the above teachings, a typical set will be omitted for purposes of simplicity.

Figure 5:
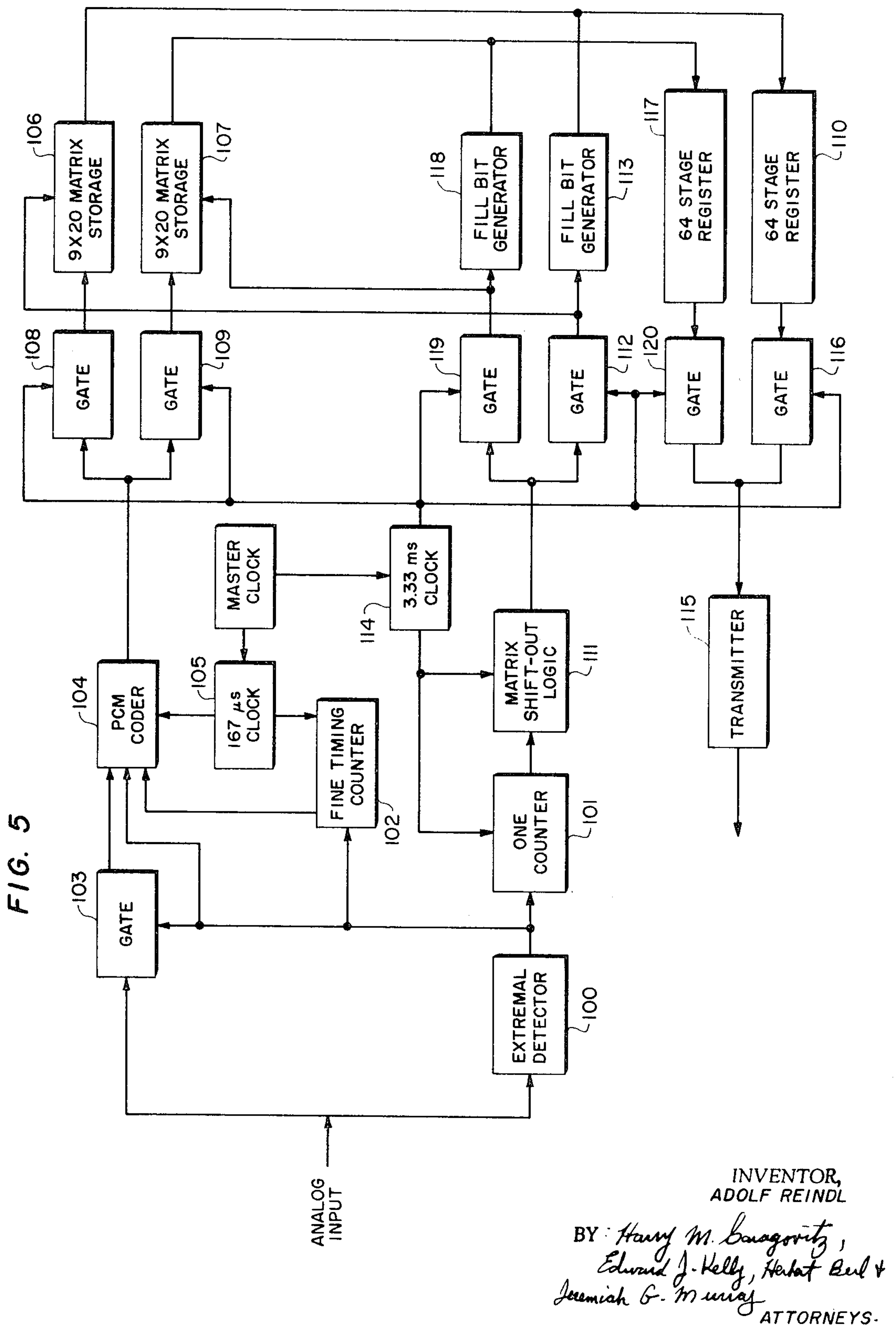
FIG. 5 is a block diagram of an apparatus capable of performing the present invention.

The above described method may also be practiced on a special purpose digital computer having only those elements which are necessary to perform the logic and storage functions set out in FIG. 3 as opposed to a general purpose digital computer which may be unduly expensive. A block diagram of a typical communication system which is capable of performing the disclosed transmission method is shown in FIG. 5 and will now be described.

The extremal detector 100 has the analog input signal connected thereto. For each extreme detected by detector 100 an impulse appears at the output thereof. The output impulses of detector 100 are counted by a ONE counter 101 which is periodically reset by a clock 114 after each 3.33 millisecond interval. The output impulses from detector 100 are also used to stop a fine timing counter 102, to open a gate 103, and as inputs to a PCM coder 104. When the gate 103 is opened by the output of detector 100, the analog input signal is fed as another input to coder 104. A third input to coder 104 is taken from the output of counter 102. Counter 102 is a two-bit counter which is reset at the end of each 167 microsecond frame by clock 105 and divides the frame into four equal parts. Therefore, the output of counter 102 will automatically step through the following series; 00, 01, 10, 11 during each 167 microsecond frame unless stopped by the output of detector 100. Each time counter 102 receives a clock pulse from clock 105, it resets to 00 and proceeds to count. An example of the extremal detector 100 can be found in U.S. Pat. No. 3,369,182.

The PCM coder 104 will now generate a nine-bit digital word from the three inputs. Six of the bits will be a digital word which is a function of the amplitude of the analog input signal at the extremal points. The seventh and eighth bits will be the output of counter 102 at the time the external point was detected i.e., when the counter 102 was stopped by detector 100. The ninth bit is provided by detector 100 to indicate that an extremal point was detected in that particular 167 microsecond frame. The output of coder 104 is clocked out and then reset to all zeros after each 167 microsecond frame by clock 105. Of course, if no extremal point is detected in a particular frame, then the output of coder 104 will be a nine-bit word containing all zeros when clocked by clock 105.

The output of coder 104 is stored in the 9×20 matrix storages 106 and 107. The first 20, nine-bit coded words from coder 104 are transmitted to matrix 106 via gate 108. The next 20 nine-bit coded words from coder 104 are transmitted to matrix 107 via gate 109. Gates 108 and 109 are controlled by the 3.33 millisecond clock 105 such that when one gate is open the other is closed and vice versa.

While one storage matrix 106 or 107 is being filled, the contents of the other storage matrix 106 or 107 is being shifted into a 64-stage register 110 or 117 according to a predetermined logic sequence as determined by the matrix shift-out logic 111. After each 3.33 millisecond interval, the matrix shiftout logic 111 receives a count from counter 101 which represents the number of extremal points detected in the last 20 167 microsecond frames. Using this information, a shift-out sequence is selected by logic 111 according to one of the seven modes shown in FIG. 1. In effect, FIG. 1 is a truth table for the logic 111. The shiftout signals from logic 111 are transmitted to matrix storages 106 or 107 via gates 112 and 119, respectively. Fill-bit generators 113 and 118 are also energized by the output of logic 111 to provide the proper fill bits to registers 110 and 117 depending on the mode selected.

As described earlier and shown in FIG. 2 the shiftout sequence generated by logic 111 will, depending on the mode, shift only selected bits from one of the matrix storages 106 or 107 to register 110 or 117. The first 20 bits shifted out will be the same for all modes and will be the one bit from each of the 20, nine-bit words stored therein which indicates whether or not an extremal point was detected in the associated 167 microsecond frame. The next group of bits shifted out will be the fine timing bits, T, associated with the first 167 microsecond frame which contains an extremal point (the number of bits in this group will be zero, one, or two depending on which of the seven modes is being used). The next group of bits, A, will represent the amplitude of the first extremal point (the number of bits shifted out now will depend on the mode, e.g., if mode V is being used, only the four most significant bits will be shifted out and the two least significant bits of the six-bit word will be lost). The sequence will continue until one of the 64-stage registers 110 or 117 is filled. The output of the registers 110 and 117 are fed to a transmitter 115 via gates 116 and 120 respectively for transmission. Gates 116 and 120 are opened alternately after each 3.33 millisecond interval by clock 114.

While the information in register 110 is being transmitted by transmitter 115 via gate 116, the 64-stage register 117 is being filled with the contents of matrix 107. At this time, the gate 119 is closed and the gate 112 is opened by clock 114. It is also pointed out that, at this time, the gate 109 is closed and the gate 108 is opened, so that matrix 106 can store the next 20 words coded by coder 104. Likewise, as the information in register 117 is being transmitted by transmitter 115, the 64-stage register 110 is being filled with the contents of matrix storage 106 and the matrix storage 107 is being filled with the output of coder 104.

Figure 4:
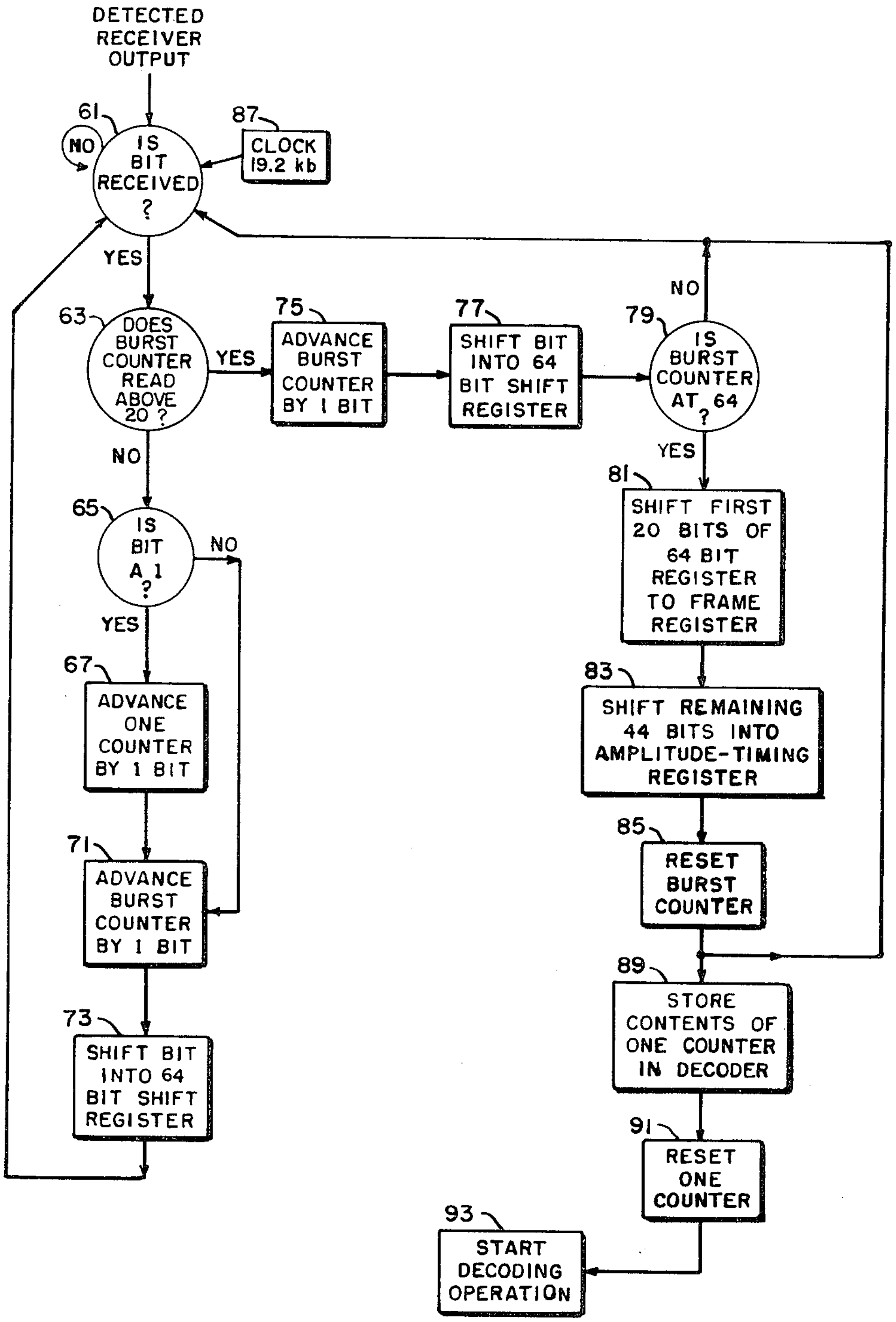

The logic and operation of the receiving terminal is indicated in the flow diagram of FIG. 4. The receiving equipment comprises a burst counter which totalizes the bits received during each interval (or burst), a ONE counter for totalizing the number of ones in each 20-bit heading, a 64-bit shift register for storing all of the bits of an interval prior to decoding and a frame register to which the 20-bit heading is applied for use in the decoding process. The received and detected video pulse train is sampled at bit frequency by clock 87. Each received bit is counted by the burst counter and in addition each of the 'ones' in the 20-bit heading is counted by the ONE counter. This operation is indicated by the boxes 63, 65, 67, 69, 71 and 75. During the first 20 bits of any interval, the answer to the question of box 63 will be 'no.' Each of these bits are then tested to determine if 0 or 1 (box 65). If found to be 1, the ONE counter is advanced by one digit (box 67). If 0, the 'no' output of box 65 will cause the burst counter to be advanced (box 71). A 1 bit will also cause the burst counter to advance by virtue of the connection between boxes 67 and 71. Following the operation of the burst counter, the bit is shifted into the 64-bit shift register for temporary storage (box 73). After the 20th received bit of every interval the answer to the question posed by box 63 will be 'yes' and each of the succeeding 44 bits will advance the burst counter by one digit and each digit will be shifted into the 64-bit register, as indicated by boxes 75 and 77. When the burst counter reaches 64, indicating the reception of a complete interval, the first 20 bits of the 64-bit register are shifted out to the frame register as indicated by box 81. These heading, or coarse timing bits are subsequently used in the decoding process to provide the coarse timing information for the decoded amplitude extreme point. The remaining 44 extremal data bits are then shifted into the amplitude-timing register, after which the burst counter is reset to await the next interval (box 85). The contents of the ONE counter are then transferred to the decoding circuitry and are used to control the number of encoding levels assigned to each extremal sample, the ONE counter is then reset (box 91), and the decoding operation is started, as indicated at box 93. While the contents of the 64-bit shift register are being decoded, the receiver will be receiving and processing the next interval of data in accordance with the diagram of FIG. 4, so that continuous bit streams may be accommodated.

The decoding operation (not illustrated) involves reconstruction of the audio signal within each interval by utilizing the data stored in the various registers and counters referred to in connection with FIG. 4. For example, the extremal data would be retrieved from the amplitude-timing register in groups of length depending on the count of the ONE counter. If, for example, the ONE counter is between 15 and 20, indicating extremal samples of two bits each, the extremal data bits would be read out to a decoder register in groups of two bits. The decoder register includes six stages and thus would be capable of decoding six-bit numbers. If the retrieved numbers have fewer digits than the capacity of the decoding register, as in the present example, the digits would be placed in the most significant stages of this register. The decoder register output would than be boxcarred to reconstruct the audio signal. If the ONE counter indicates one of the modes (I or II) wherein fine-timing bits are used, the decoding circuitry would separate the fine timing data from the extremal amplitude data and the decoded fine timing data would be used to locate the extreme point data within the frame. The decoding circuitry would further include means to separate the fill bit data from the rest of the data and process it appropriately. As in the case of the transmitter, the receiver may also be a digital computer having the proper input and output equipment.

While the invention has been described in connection with an illustrated example and in connection with particular bit frequencies, frame and interval lengths, etc., these specific figures are illustrative only and hence the invention should be limited only by the scope of the appended claims.

What is claimed is:

1. A method of transmitting an analog signal in digital form comprising the steps of, detecting the extremal amplitude points of said analog signal, counting the number of such extremal amplitude points in contiguous intervals of said analog signal, encoding said extremal amplitude points within each of said intervals into binary numbers, the number of encoding levels depending on the number of such extremal amplitude points within each said interval, the number of encoding levels for each extremal amplitude point within each interval decreasing as the number of said extremal amplitude points within that interval increases.

2. A method of transmitting an analog signal in digital form comprising the steps of, detecting the extremal points of said analog signal within successive intervals, said intervals being equally divided into a plurality of *n* frames, each of said frames being of length equal to one-half cycle of the highest frequency component of said analog signal, counting the number of said extremal points within each said interval, transmitting during each said interval an *n*-bit binary number indicating in which of the frames of said interval said extremal points lie, then transmitting the amplitude and fine timing data of said extremal points in the form of binary numbers, the number of encoding levels for amplitude representation and the number of encoding levels for fine timing thereof being dependent on the number of extremal points within each interval, the number of encoding levels decreasing as the number of said extremal points within that interval increases.

3. The method of claim 2, in which a fixed number of bits are transmitted during each interval and wherein said *n*-bit binary number and said amplitude and fine timing data comprise a variable number of bits equal to or less than said fixed number of bits, and wherein said fixed number of bits is obtained in each interval by adding a variable number of fill-bits to each interval, and wherein said fill-bits carry information.

4. A method of transmitting an analog signal in digital form comprising the steps of, detecting the extremal points of said analog signal within successive intervals of said analog signal, said intervals being equally divided into a plurality of *n* frames, each frame being of length equal to one half cycle of the highest frequency component of said analog signal, analyzing said analog signal before transmission to determine the number and time position of each of said extremal points within each interval, transmitting during each interval an *n*-bit binary number indicating in which of the frames of said interval said extremal points lie, then transmitting the amplitudes and fine timing data of said extremal points in the form of binary numbers, the number of encoding levels for amplitude and fine timing representation decreasing as the number of extremal points within that interval increases.

* * * * *

UNITED STATES PATENT OFFICE
CERTIFICATE OF CORRECTION

Patent No. 3,646,445 Dated February 29, 1972

Inventor(s) ADOLF REINDL

It is certified that error appears in the above-identified patent and that said Letters Patent are hereby corrected as shown below:

In the specification:

Column 1, after line 3, insert "The invention described herein may be manufactured, used, and licensed by or for the Government for governmental purposes without the payment to me of any royalty thereon".

Column 2, line 12, cancel "microsecond" and after "microseconds" insert -- and -- .

Column 2, line 13, after "an" insert -- extreme point within each frame -- ;

Column 2, lines 14 to 16 cancel "The invention described herein may be manufactured, used, and licensed by or for the Government for governmental purposes without the payment to me of any royalty thereon".

Column 2, line 51, after "42" insert -- data -- .

Signed and sealed this 17th day of April 1973.

(SEAL)
Attest:

EDWARD M.FLETCHER,JR.
Attesting Officer

ROBERT GOTTSCHALK
Commissioner of Patents